July 20, 1937.  H. N. OTT  2,087,329
MICROSCOPE
Original Filed Nov. 16, 1935
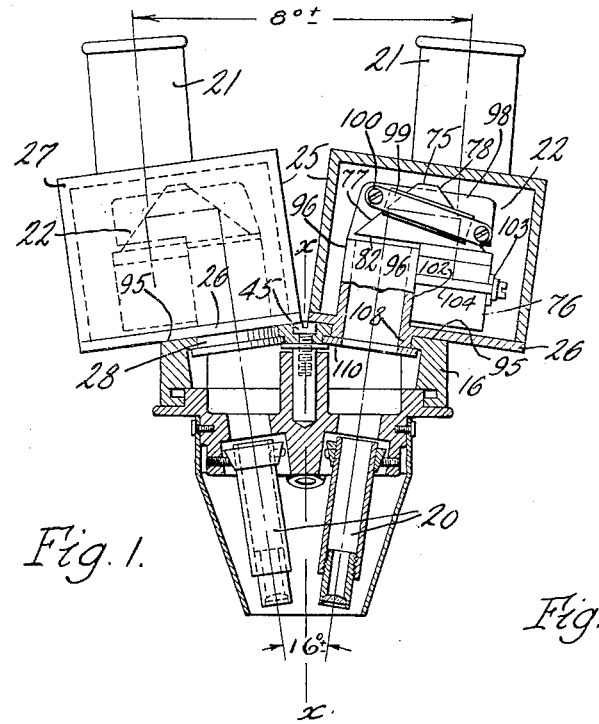
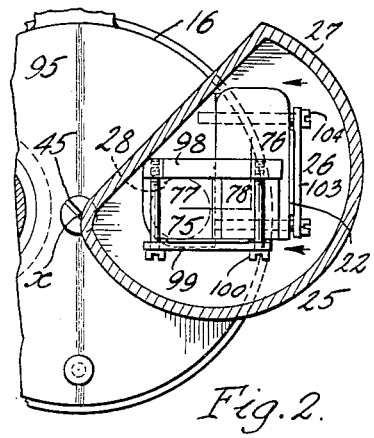
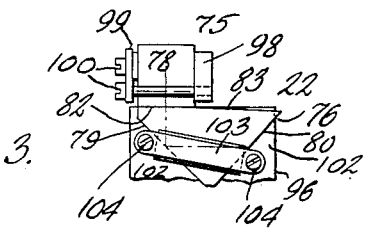
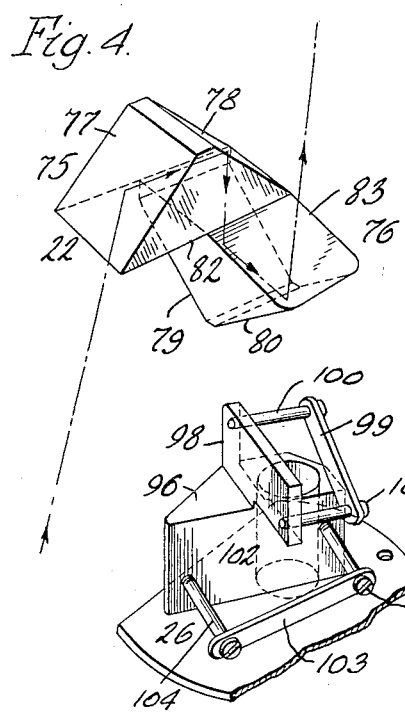
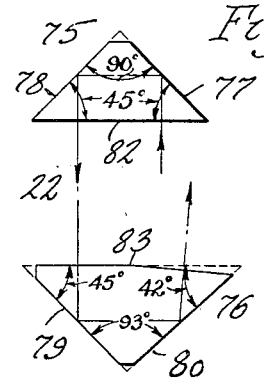
INVENTOR
Harvey N. Ott
Parker, Prochnow & Same
ATTORNEYS Patented July 20, 1937

2,087,329

UNITED STATES PATENT OFFICE 2,087,329

MICROSCOPE

Harvey N. Ott, Buffalo, N. Y., assignor to Spencer Lens Company, Buffalo, N. Y.

Original application November 16, 1935, Serial No. 50,165. Divided and this application June 25, 1936, Serial No. 87,189

2 Claims. (Cl. 88—39)

This invention relates to improvements in binocular microscopes of the kind having the optical axes of a pair of objectives arranged at different angles from those of the optical axes of the eye pieces or oculars.

In such a microscope it is desirable to have the axes of the oculars converge at substantially the normal angle of convergence of the human eyes, which is usually about eight degrees, so that a person using the microscope can remove his gaze from the instrument for reading or making notes, and return to the microscope without requiring readjustment of the eyes.

On the other hand, the angle between the pair of objectives should preferably be somewhat greater than the angle between the oculars, say sixteen degrees, since by so disposing the objectives greater perspective and stereoscopic effect results.

This application is a division of my copending application for Letters Patent, Serial No. 50,165, filed November 16, 1935 for Improvements in microscopes.

An object of this invention is to provide a binocular microscope with novel, improved and simplified reflecting means, in the nature of a prism system for changing the angle of the image rays from one angle at the paired objectives to a different angle at the oculars, and for erecting the image.

Another object of the invention is to provide a novel prism system of this sort, one for each eyepiece which is composed of the minimum number of parts and is reliable and dependable in use.

Various other objects and advantages of the invention will be apparent from the following description of an embodiment thereof and the novel features of the invention will be pointed out in connection with the appended claims.

In the drawing:

Fig. 1 is a face view, partly in section, of a portion of a binocular microscope in which the features of my invention are embodied;

Fig. 2 is a plan view, partly in section, of one of the reflecting systems of the instrument, mounted in its housing;

Fig. 3 is a side elevation thereof, taken in the direction of the arrows, Fig. 2;

Fig. 4 is a perspective view of two prisms forming one of the reflecting means of the instrument, detached from their mountings, and illustrating the path of light rays therethrough from one of the objectives to its associated ocular;

Fig. 5 is a perspective view of a mounting for the prisms of Fig. 4;

Fig. 6 is a diagrammatic representation of the prisms showing the passage of a light ray therethrough.

The optical system of the instrument, as shown in Fig. 1, includes one or more sets of paired objectives, one pair 20 of which is illustrated in Fig. 1, and a pair of oculars or eyepiece tubes 21. Disposed between each objective 20 and one of the oculars 21 is one of my improved reflecting systems 22 so positioned that image rays passing upwardly through an objective 20 are diverted by the associated reflecting system 22 and reflected to the companion ocular 21 at an angle different to that of the image rays at the objective. The reflecting systems 22 also erect the images.

Each reflecting system 22 is mounted in a housing 25 which includes a base 26 and a cap or cover portion 27. The prism housings 25 are substantially of cylindrical form and the base 26 of each housing is rotatably connected to the top of a body member or support 16 by a hollow swivel connection 28 which is concentric with the axis of the related objective 20, see Figs. 1 and 2. Each eyepiece tube or ocular 21 is mounted eccentrically of the swivel connection of its supporting housing 25 upon the top wall of the housing and, by rotating the housings 25 about their swivel connection 28, the oculars 21 may be moved towards and from each other so that they may be adjusted to suit the pupillary distances of the eyes of different users of the instrument.

As shown, each objective 20 is mounted in the lower portion of the body member 16, in alinement with the hollow swivel connection 28 of the related ocular mounting. The details of the mounting in which the objectives are supported are fully disclosed in my said pending application Serial No. 50,165, to which reference may be had for a more full disclosure.

However, in order to produce the desired stereoscopic effect, the axes of the two objectives 20 may be arranged at a suitable angle, for example, about 16° apart.

On the other hand the two oculars 21 are each disposed so that the angle between them is considerably less than 16°, say approximately 8°, whereby the user of the instrument can view objects through the instrument at a more convenient or comfortable angle, that is, an angle which is approximately that of his eyes when making notes or observations adjacent the instrument, the oculars, at the same time being slightly inclined toward the user.

Each of the reflecting means or systems 22, before mentioned, includes two reflecting units or structures, each having a pair of opposed, angularly related reflecting surfaces disposed so that image rays passing upwardly through an objective 20 are intercepted by a reflecting surface of one of said units and are diverted therefrom to the other surface of that unit in a path lateral to the axis of that objective, and are then in turn diverted back along a path towards the objective to one of the reflecting faces of the other unit, from which the rays are, in turn, reflected to the other face of that unit. The rays are then diverted upwardly by that face through the associated ocular 21 but at a different angle to the path of the rays through the objective, and during the passage of the rays through the reflecting means or system 22, the image is erected.

In the construction illustrated, the reflecting units of each reflecting system 22 comprises a pair of glass prisms 75 and 76 rigidly mounted upon the base 26 of the housing for the system. The prism 75 has two reflecting faces 77 and 78 which are arranged so that the angle between them (which is preferably 90°) faces towards the objective with which it is associated and is so disposed that the face 77 thereof extends obliquely at any angle of 45° across the axis of that objective, while the other reflecting face 78 is disposed laterally of said axis. The other prism or unit 76 is also formed with two opposed reflecting surfaces 79 and 80 so that the angle between them faces upwardly towards the associated ocular 21 with the face 80 extending obliquely across the axis of that ocular. The prisms or units 75 and 76 are completed by faces 82 and 83 extending across the angles of the prisms.

The two prisms of each system are disposed crosswise of and at right angles to each other with approximately half of the face 82 of the prism 75 extending parallel with and preferably engaging upon approximately half of the face 83 of the prism 76 as shown clearly in Fig. 4. The other portion of the face 83 is cut away at a slight angle or taper as shown in Figs. 3 and 6 so that this portion, which faces the ocular 21, will be normal to the axis of that ocular to thereby avoid distortion of the image by refraction. By this arrangement it will be seen upon reference to Fig. 4 that a ray of light passing upwardly from the objective first impinges upon the oblique face 77 of the prism 75, is diverted transversely thereby to the opposed face 78 which in turn reflects the ray downwardly through the abutting portions of the faces 82 and 83 of the two prisms. The ray continues through those faces to the oblique face 79 of the prism 76, is diverted thereby in a lateral direction (but at right angles to the direction in which it was first directed laterally by the face 77) until it is intercepted by the last oblique face 80 of the prism 76. Here it is reflected upwardly through the ocular.

In order to change the angle between the rays passing through a pair of objectives which, as above stated, may be approximately 16° to a different angle, say an angle of approximately 8° between the oculars I form one of the prisms, of each reflecting system, for example, the prism 76 so that the angle between the reflecting faces thereof is greater than a right angle, for example, 93°, while the corresponding angle of the prism 75 is 90°.

As will be seen from an examination of Figs. 1 and 2, the top face 95 of the part 16 of the body is divided into two portions which are slightly inclined in opposite directions from front to rear of the instrument from a line passing through the axis $x$ and these inclined face planes are normal or at right angles to the axes of the objectives, and the base 26 of the housings 25 are in parallel relation to these faces. The prism systems 22 in said housings 25 are rigidly mounted so as to turn with the housings, and since, as before stated, the swivel connections 28 are concentric with the axes of the objectives, the angle at which the image rays leave the reflecting systems and pass into the oculars will remain the same with reference to the axis of the objectives in any position to which the housings and oculars are turned for adjusting the pupillary distance between the oculars.

However, in the movement of the oculars towards and from one another in their adjustments to different pupillary distances the angle between the axes of the oculars will change slightly. The maximum change in use, however, is relatively small, say from an angle of about 7° to an angle of about 9° or 10°.

This variation is of advantage in that a person having a relatively narrow pupillary distance will normally see things at close range through a narrower stereoscopic angle than a person having a wider pupillary distance, and vice versa.

The reflecting means or prism system 22 can be rigidly mounted in the housings 25 in any suitable way. As shown in the drawing, see Figs. 1, 2 and 5, I provide the base 26 of each housing with an upstanding, hollow boss or sleeve 96 which is apertured concentrically with the swivel connection for that housing, and this boss terminates in a flat face across which an end of the prism 75 extends so as to position the reflecting face 77 thereof to intercept the rays from the associated objective. This prism 75 is rigidly secured in this position between a fixed or integral plate 98 extending upwardly from the boss 96, and a clamping bar 99 which is secured to the plate 98 by screws 100. The other prism 76 is secured between a flat face 102 on the boss 96 and a clamping bar 103 as by screws 104. The swivel connection between each housing and the part 16 of the body may be constructed by the provision of a downwardly extending annular shoulder 108 formed on the bottom or base 26 of the prism housing and which rotatably fits in a hole extending through the top wall of said part 16. A ring or retaining member 110 abutting the bottom face of the shoulder 108 and the adjacent bottom face of the wall of said arm part 16 and suitably secured, acts to retain the housing in rotatable connected relation to the part 16.

I claim as my invention:

1. In a microscope having an objective, an ocular which has its axis at one side of and at approximately an angle of 4° to said objective, reflecting means interposed between said objective and said ocular comprising a prism having a pair of opposed, inclined reflecting surfaces with an angle between them of 90°, one of said surfaces being disposed to receive image rays from said objective and reflect the same to the other surface of said prism, and a second prism having a pair of reflecting surfaces with an angle between them of 93°, one of said surfaces being disposed to receive the image rays from the second surface of said first prism and reflect them to the second surface of said second prism, said second surface of said second prism being disposed to reflect said rays into said ocular, and one of said prisms being arranged in a direction transverse of the other prism, whereby an image is erected in the passage of said rays through said reflecting means, and is reflected into the ocular along the axis thereof by reason of the 93° angle between the reflecting surfaces of said second prism.

2. A binocular microscope having a set of paired objectives having their axes at an angle of approximately 16°, two oculars arranged with their axes at approximately 8° and each of which receives image rays from one of said objectives and has its axis disposed at an angle of approximately 4° to that of the corresponding objective, an image erecting reflecting system interposed between each of said objectives and its ocular and comprising a prism having a pair of opposed, inclined reflecting surfaces disposed at an angle of 90°, one surface of said prism being disposed obliquely upon the axis of said objective to reflect image rays therefrom to the other surface of said prism, and a second prism having a pair of reflecting surfaces disposed at an angle of 93° and arranged crosswise of said first prism and having one of its reflecting surfaces positioned obliquely upon the axis of said ocular, and the other surface of said second prism being positioned to receive the image rays from the second surface of said first prism and reflect them to the first mentioned surface of said second prism, whereby that surface of said second prism which crosses the axis of said ocular will reflect image rays into said ocular along the axis thereof.

HARVEY N. OTT.